(12) United States Patent
Senior

(10) Patent No.: US 10,026,396 B2
(45) Date of Patent: Jul. 17, 2018

(54) FREQUENCY WARPING IN A SPEECH RECOGNITION SYSTEM

(71) Applicant: Google LLC, Mountain View, CA (US)

(72) Inventor: Andrew W. Senior, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/221,491

(22) Filed: Jul. 27, 2016

(65) Prior Publication Data

US 2017/0032802 A1 Feb. 2, 2017

Related U.S. Application Data

(60) Provisional application No. 62/198,057, filed on Jul. 28, 2015.

(51) Int. Cl.
| | | |
|---|---|---|
| *G10L 15/16* | (2006.01) | |
| *G10L 15/02* | (2006.01) | |
| *G10L 15/06* | (2013.01) | |
| *G10L 25/30* | (2013.01) | |
| *G10L 21/013* | (2013.01) | |

(52) U.S. Cl.
CPC ............ *G10L 15/16* (2013.01); *G10L 15/02* (2013.01); *G10L 15/063* (2013.01); *G10L 25/30* (2013.01); *G10L 2021/0135* (2013.01)

(58) Field of Classification Search
CPC ....... G10L 15/063; G10L 15/16; G10L 15/02; G10L 2021/0135; G10L 21/013; G10L 25/30

See application file for complete search history.

(56) References Cited

U.S. PATENT DOCUMENTS 8,838,446 B2 * 9/2014 Jeong ............... G10L 15/02
704/202
8,909,527 B2 12/2014 Goffin et al.
(Continued)

FOREIGN PATENT DOCUMENTS

EP 0 392 728 9/1996

OTHER PUBLICATIONS

Pizt and Ney, "Vocal Tract Normalization Equals Linear Transformation in Cepstral Space," IEEE Transactions on Speech and Audio Processing, 13(5):930-944, Sep. 2005.
(Continued)

*Primary Examiner* — Angela A Armstrong
(74) *Attorney, Agent, or Firm* — Fish & Richardson P.C.

(57) ABSTRACT

Methods, systems, and apparatus, including computer programs encoded on computer storage media, for receiving a sequence representing an utterance, the sequence comprising a plurality of audio frames; determining one or more warping factors for each audio frame in the sequence using a warping neural network; applying, for each audio frame, the one or more warping factors for the audio frame to the audio frame to generate a respective modified audio frame, wherein the applying comprises using at least one of the warping factors to scale a respective frequency of the audio frame to a new respective frequency in the respective modified audio frame; and decoding the modified audio frames using a decoding neural network, wherein the decoding neural network is configured to output a word sequence that is a transcription of the utterance.

9 Claims, 5 Drawing Sheets

(56) References Cited

U.S. PATENT DOCUMENTS

2011/0066426 A1    3/2011  Lee
2014/0207448 A1    7/2014  Wang et al.
2015/0032449 A1*   1/2015  Sainath ................... G10L 15/16
                                                          704/235

OTHER PUBLICATIONS

Walters, "Auditory-Based Processing of Communication Sounds: Figure 23," Acoustic Scale Wiki, May 26, 2011 [retrieved on Jul. 16, 2015]. Retrieved from the Internet: URL<http://www.acousticscale.org/wiki/index.php/Auditory-Based_Processing_of_Communication_Sounds#Comparison_with_standard_VTLN>, 46 pages.

\* cited by examiner

FREQUENCY WARPING IN A SPEECH RECOGNITION SYSTEM

CROSS-REFERENCE TO RELATED APPLICATION

This application claims priority to U.S. Provisional Application No. 62/198,057, filed on Jul. 28, 2015. The disclosure of the prior application is considered part of and is incorporated by reference in the disclosure of this application.

BACKGROUND

This specification relates to frequency warping in a speech recognition system.

Generally, a speech recognition system can perform differently for different speakers saying identical speech. Each speaker have a respective vocal tract length. Different vocal tract lengths cause different frequencies of speech to be generated and those different frequencies may be processed differently by the speech recognition system.

SUMMARY

In general, this specification describes frequency warping in a speech recognition system.

In general, one innovative aspect of the subject matter described in this specification can be embodied in the methods that include the actions of receiving a sequence representing an utterance, the sequence comprising a plurality of audio frames; determining one or more warping factors for each audio frame in the sequence using a warping neural network; applying, for each audio frame, the one or more warping factors for the audio frame to the audio frame to generate a respective modified audio frame, wherein the applying comprises using at least one of the warping factors to scale a respective frequency of the audio frame to a new respective frequency in the respective modified audio frame; and decoding the modified audio frames using a decoding neural network, wherein the decoding neural network is configured to output a word sequence that is a transcription of the utterance.

Implementations can include one or more of the following features. The warping neural network is the decoding neural network, and wherein the decoding neural network comprises: a warping neural network layer configured to apply the one or more warping factors for each input audio frame in an input sequence to the input audio frame to generate a respective warped input audio frame from the input audio frame, and wherein the one or more warping factors are parameters of the warping neural network layer; and one or more decoding neural network layers configured to collectively process the warped input audio frames to generate an output word sequence that is a transcription of an utterance represented by the input audio sequence. Training the decoding neural network on training data to determine initial trained values of the one or more warping factors, wherein the training comprises backpropagating decoding errors through the decoding neural network layers to the warping layer to adjust current values of the one or more warping factors. Training the decoding neural network comprises: generating an output for the decoding neural network given a portion of audio frames in a sequence using current values of the one or more warping factors at the warping neural network layer, wherein the output is a plurality of text probability mappings, wherein each text probability mapping is a probability that the training audio frame is represented by a respective transcription of text; selecting a text probability mapping having a highest probability; determining an error for the highest probability; and backpropagating the error to adjust the one or more warping factors, wherein the adjusted one or more warping factors are applied to subsequent audio frames of the sequence. The warping neural network is configured to process each audio frame and generate the one or more warping factors for the audio frame in accordance with trained values of a set of parameters. Training the warping neural network on training data that associates each of a plurality of training audio frames with one or more corresponding warping factors. The training data is generated by another decoding neural network, the other neural network comprising: a warping neural network layer configured to apply one or more warping factors for each input training audio frame in an input sequence to the input training audio frame to generate a respective warped input training audio frame from the input training audio frame, and wherein the one or more warping factors are parameters of the warping neural network layer, and one or more decoding neural network layers configured to collectively process the warped input training audio frames to generate an output word sequence that is a transcription of an utterance represented by the input audio sequence; and wherein generating the training data further comprises: training the other decoding neural network to determine initial trained values of the one or more warping factors, wherein the training comprises, for each training audio frame, backpropagating decoding errors for the training audio frame through the decoding neural network layers to the warping layer to adjust current values of the one or more warping factors; and using, for each training audio frame, the adjusted current values and the training audio frame as the training data to train the warping neural network. The applying comprises: using a first warping factor in the one or more warping factors to scale frequency within a first frequency range of the audio frame; and using a second respective warping factor in the one or more warping factors to scale frequency within a second frequency range of the audio frame to generate the respective modified audio frame.

Particular embodiments of the subject matter described in this specification can be implemented so as to realize one or more of the following advantages. The speech recognition system can determine one or more optimal warping factors to apply to a sequence of audio frames representing an utterance without trial and error, thereby decreasing processing time for speech recognition. The speech recognition system can adapt warping factors to any sequence of audio frames in real time to improve speech recognition.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
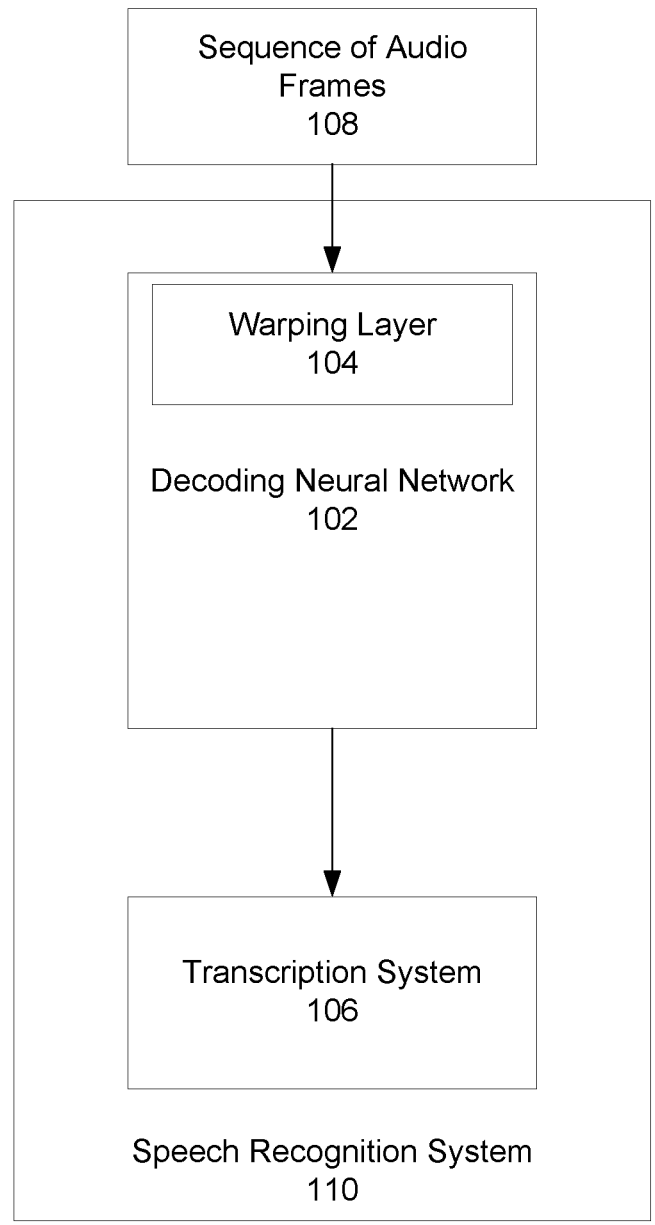
FIG. 1 illustrates an example architecture for frequency warping in a speech recognition system.

FIG. 1 illustrates an example architecture 100 for frequency warping in a speech recognition system 110. The speech recognition system 110 is an example of a system implemented as computer programs on one or more computers in one or more locations, in which the systems, components, and techniques described below are implemented.

The speech recognition system 110 receives, as input, a sequence of audio frames 108. The sequence 108 is a data sequence representing an utterance, i.e., a vocalization of one or more words or sentences. The sequence 108 can be represented as multiple audio frames having a predetermined length. The sequence 108 can be received as non-training audio frames, e.g., received in real-time through a microphone of a user device, or as training audio frames, e.g., from a dataset of sequences of audio frames.

To decode the utterance, the speech recognition system 110 can process the multiple audio frames of the sequence 108 sequentially to output a transcription of the utterance. The speech recognition system 110 can use a decoding neural network 102, which processes the sequence 108 to generate an output, e.g., a set of probabilities. A transcription system 106 can process the output from the decoding neural network 102 to generate a word sequence that represents a transcription of the utterance. In some implementations, the transcription system 106 generates a set of probabilities, each of which are associated with a respective word sequence. Each probability can represent a likelihood that the sequence of audio frames 108 is represented by the respective word sequence.

In particular, the decoding neural network 102 is a speech recognition neural network that has been modified to include a warping layer 104 that applies one or more warping factors to each audio frame to generate a respective modified audio frame. For example, at the warping layer 104, the decoding neural network 102 can scale a frequency of the audio frame using at least one of the warping factors. By way of illustration, if the warping factor is 1.2, the decoding neural network 102 can multiply the frequency of the audio frame by 1.2 before passing the audio frame to subsequent layers of the decoding neural network 102. Therefore, applying the one or more warping factors at the layer 104 can normalize a frequency of a particular audio frame.

The warping layer 104 can be a first layer in the decoding neural network 102 to receive each audio frame and can provide outputs of the warping layer 104 to subsequent decoding layers of the decoding neural network 102. This can allow subsequent decoding layers in the decoding neural network 102 to process modified audio frames having normalized frequencies, i.e., normalized or warped audio frames, which can improve accuracy of the speech recognition system 110. In some implementations, the warping factors are parameters of the warping layer 104 in the decoding neural network 102.

The speech recognition system 110 can continually adjust the warping factors, i.e., parameters of the warping layer 104, while processing audio frames 108 of the utterance. That is, the speech recognition system 110 adjusts the warping factors during training and optionally, during run-time.

During training, the decoding neural network 102 is trained on training data including a dataset of training utterances, i.e., training sequences of audio frames. The dataset of training utterances can associate sequences of audio frames with known transcriptions of the sequences. In particular, the decoding neural network 102 can use the training data to determine initial trained values for the warping factors at the warping layer 104.

To determine the initial trained values for the warping factors, the speech recognition system 110 determines, using the dataset of training utterances, decoding errors between the known transcription for the training sequence and a transcription generated by the transcription system 106 for the training sequence. The speech recognition system 110 can backpropagate the decoding errors through the layers of the decoding neural network 102 to the warping layer 104. The decoding neural network 102 can adjust current values of the warping factors using the backpropagated decoding errors.

In some implementations, the speech recognition system 110 uses the decoding errors only to adjust values of the warping factors at the warping layer 104, i.e., the backpropagation does not affect parameters in other layers of the decoding neural network 102 because those other layers have already been trained. In some other implementations, the speech recognition system 110 uses the decoding errors to adjust all parameters of the decoding neural network 102.

During runtime, the speech recognition system 110 can optionally adjust the warping factors using decoder errors generated by treating outputs from the transcription system 106 as accurate. As described above, the transcription system 106 can generate an output of a set of probabilities, each of which are associated with a respective word sequence for a portion of a sequence of audio frame inputs, e.g., a text probability mapping. The speech recognition system 110 can generate a respective decoding error using a highest probability from the output. By way of illustration, if the portion of the sequence has a 95% probability of being represented by the phrase "hello world", and the 95% probability is a highest probability in a set of other probabilities, the decoding error can be 5%, i.e., 100%-95%. Each decoding error can be backpropagated to adjust the warping factors of the warping layer 104 in real-time.

In some implementations, the entire sequence of audio frames, including the already-processed portion of the sequence of audio frames, can be provided as an input to the speech recognition system 110 again, thereby utilizing the adjusted warping factors generated in real-time.

In some other implementations, the speech recognition system 110 processes a remaining portion of the sequence of audio frames using the adjusted warping factors. As an example, during run-time for a particular sequence of audio frames, the speech recognition system 110 can process a portion of the sequence, e.g., the first fifty audio frames of the particular sequence, to adjust the warping factors based on the processed portion of frames, and continue to process subsequent audio frames of the sequence with the adjusted warping factors. As a result, the decoding neural network 102 can customize the warping factors to the particular sequence of audio frames.

Figure 2:
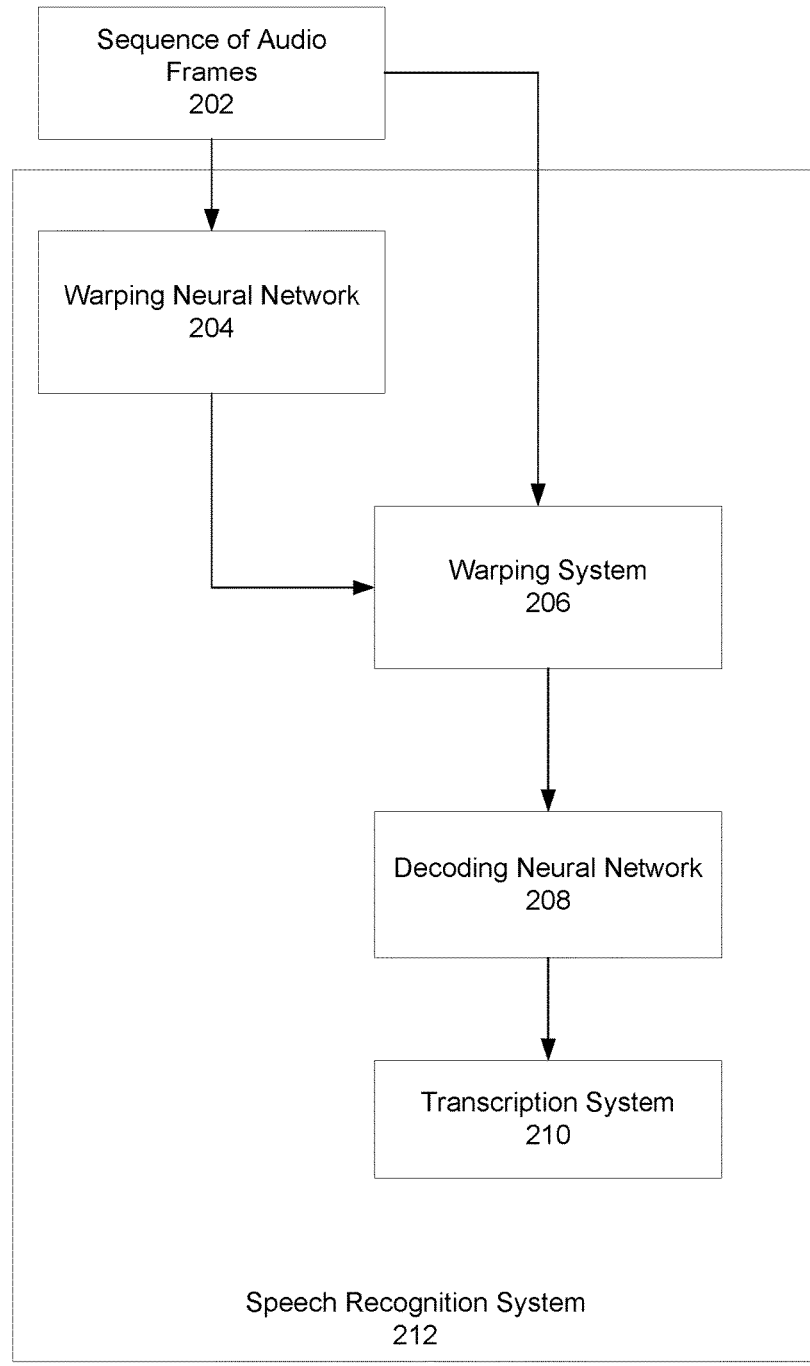
FIG. 2 illustrates another example architecture for frequency warping in a speech recognition system.

FIG. 2 illustrates another example architecture 200 for frequency warping in a speech recognition system 212. The speech recognition system 212 provides a sequence of audio frames 202 represented by an utterance to a warping neural network 204.

For each audio frame of the sequence 202, the warping neural network 204 outputs one or more optimal warping factors for the audio frame. The warping neural network 204 will be described further below.

The optimal warping factors, along with the respective audio frame of the sequence 202, are provided to a warping system 206. If the warping neural network 204 outputs one optimal warping factor, the warping system 206 applies the optimal warping factor to the corresponding audio frame to generate a respective modified audio frame, i.e., a warped audio frame with a normalized frequency. For example, the warping system 206 can use the optimal warping factors to scale a frequency of the respective audio frame as described above with reference to FIG. 1.

In some implementations, when the warping neural network 204 determines more than one optimal warping factor, the warping neural network 204 also maps a respective frequency range to each optimal warping factor. The warping system 206 can apply each optimal warping factor to the respective frequency range of the audio frame. By way of illustration, the warping system 206 can use a first warping factor to scale frequency within the first respective frequency range of the audio frame and a second warping factor to scale frequency within the second respective frequency range of the audio frame to generate the respective modified audio frame.

The speech recognition system 212 processes the warped audio frames using a decoding neural network 208 to generate a series of probabilities, as described above with reference to FIG. 1. The decoding neural network 208 can be a conventional decoding neural network, i.e., one with no warping layer. This is in contrast to the decoding neural network 102 of FIG. 1 having the warping layer 104.

A transcription system 210 can process an output of the decoding neural network 208 to generate a transcription of the utterance. The transcription system 210 is similar to the transcription system 106 of FIG. 1.

The warping neural network 204 is a neural network that has been trained to receive an audio frame and to process the audio frame to generate one or more optimal warping factors for the audio frame. The warping neural network 204 can be a feedforward neural network that has one or more layers.

To train the warping neural network 204, the speech recognition system 212 can use training data generated from a decoding neural network with a warping layer, e.g., the decoding neural network 102 of FIG. 1. This will be described further below with reference to FIG. 3.

The speech recognition system 212 trains the warping neural network 204 using the generated training data to determine trained values of parameters in the warping neural network 204 using conventional neural network training techniques.

In some implementations, the warping neural network 204 is also trained on user-submitted data that associates audio frames with warping factors.

In some implementations, the warping neural network 204 and the decoding neural network 208 are jointly trained. That is, the warping neural network 204 and the decoding neural network 208 can be combined. In particular, output of the warping neural network 204, e.g., one or more warping factors, can be provided as input to the decoding neural network 208. The combined neural network can backpropagate errors, as described above, and adjust parameters of both the warping neural network 204 and the decoding neural network 208 so the warping neural network 204 can be trained to identify optimal warping factors and the decoding neural network 208 can be trained to transcribe utterances.

Figure 3:
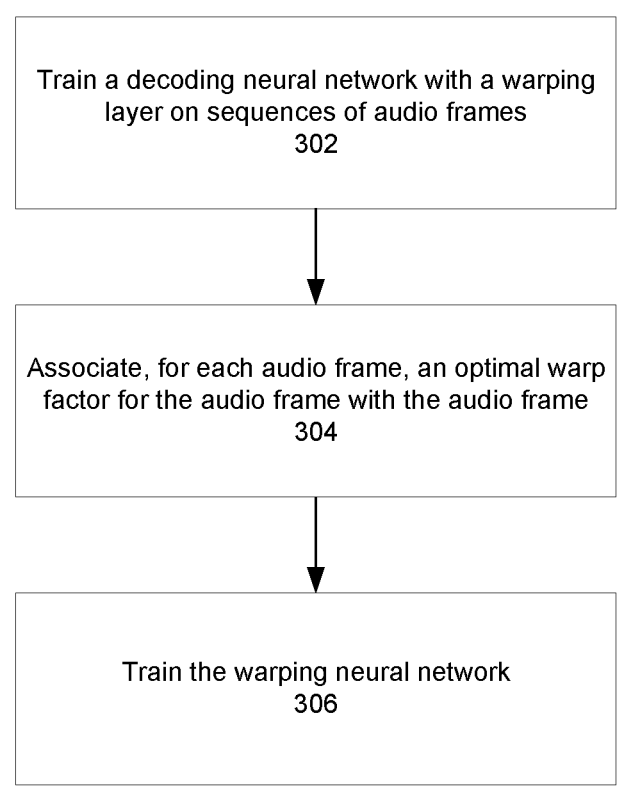
FIG. 3 is a flow diagram of an example method for training a warping neural network in a speech recognition system.

FIG. 3 is a flow diagram of an example method 300 for training a warping neural network in a speech recognition system. For convenience, the method 300 will be described with respect to a system, e.g., the speech recognition system 212 of FIG. 2, having one or more computing devices that execute software to implement the method 300.

The system trains a decoding neural network with a warping layer, e.g., the decoding network 102 of FIG. 1, on sequences of audio frames (step 302). The training can be on training data of a dataset of training utterances, as described above with reference to FIG. 1. When training on a particular sequence of audio frames, the decoding neural network generates a decoding error that is backpropagated to the warping layer, as described above. The system adjusts the parameters of the warping layer using the decoding error for the particular sequence adjusts the warping factors of the warping layer.

The system associates, for each audio frame of the sequence of training audio frames from the dataset, the adjusted warping factor for the audio frame with the audio frame (step 304) to generate training data for the warping neural network. That is, each training audio frame, along with its respective adjusted warping factor, is designated as training data for the warping neural network.

The system trains the warping neural network on the training data for the warping neural network (step 306) to determine trained values of parameters in the warping neural network. That is, the system trains the warping neural network to adjust the values of the parameters of the warping neural network to minimize the error between the warping factors generated by the warping neural network for audio frames in the training data and the warping factors associated with the audio frames in the training data.

Figure 4:
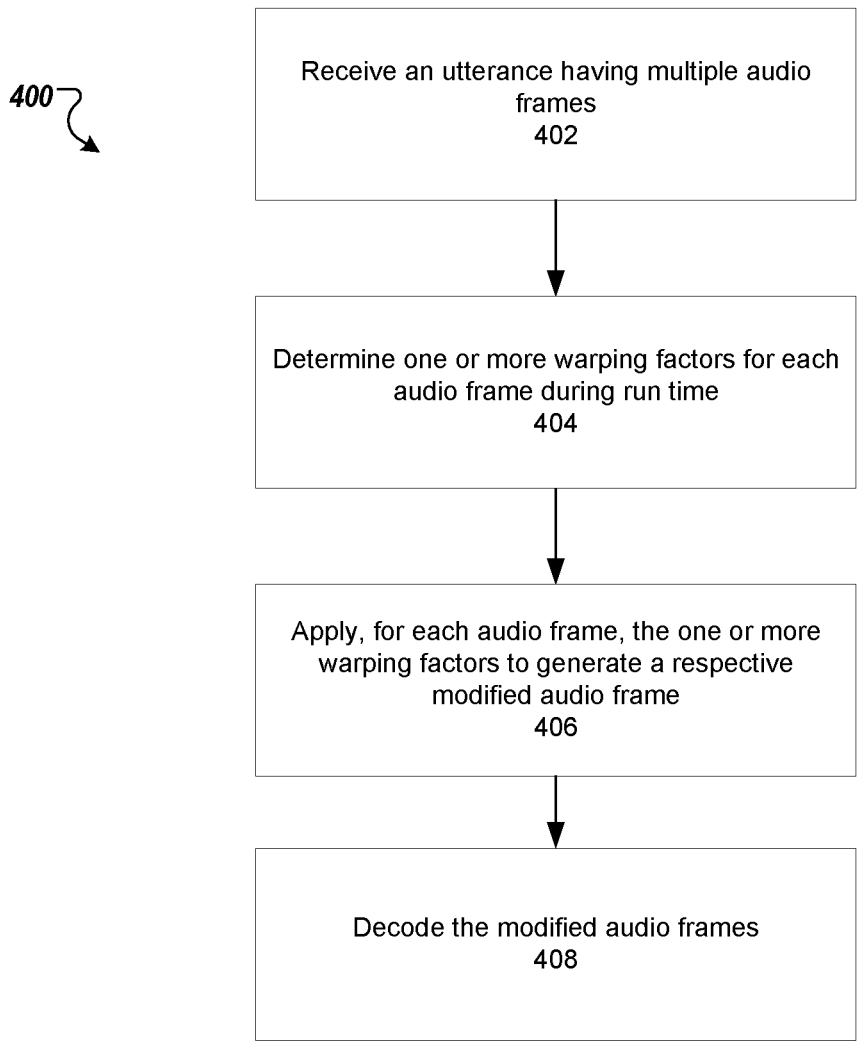
FIG. 4 is a flow diagram of an example method for frequency warping in a speech recognition system.

FIG. 4 is a flow diagram of an example method 400 for frequency warping in a speech recognition system. For convenience, the method 400 will be described with respect to a system, e.g., the system 110 of FIG. 1, having one or more computing devices that execute software to implement the method 400.

The system receives a data sequence representing an utterance (step 402). The sequence can include multiple audio frames as described above in reference to FIG. 1.

The system determines one or more warping factors for each audio frame in the sequence using a warping neural network (step 404). In some implementations, the warping neural network the same network as the decoding neural network. The system determines the one or more warping factors at a warping layer during run time of the system. That is, the system can generate decoding errors by treating speech recognition system outputs as accurate. The system can then backpropagate the decoding errors to a warping layer of the decoding neural network and adjust the warping factors at the warping layer based on the decoding errors. The system continually adjusts the warping factors in real-time by backpropagating decoding errors of multiple audio frame inputs in multiple sequences. This is described above with reference to FIG. 1.

The system applies, for each audio frame, the one or more adjusted warping factors for the audio frame to the audio frame to generate a respective modified audio frame (step 406). As described above in reference to FIG. 1, the system uses at least one of the warping factors, i.e., parameters of a warping layer, to scale a respective frequency of the audio frame to a new respective frequency in the respective modified audio frame.

The system decodes the utterance by processing the modified audio frames using a decoding neural network (step 408) as described above with reference to FIGS. 1 and 2. The decoding neural network is configured to output a word sequence that is a transcription of the utterance.

Figure 5:
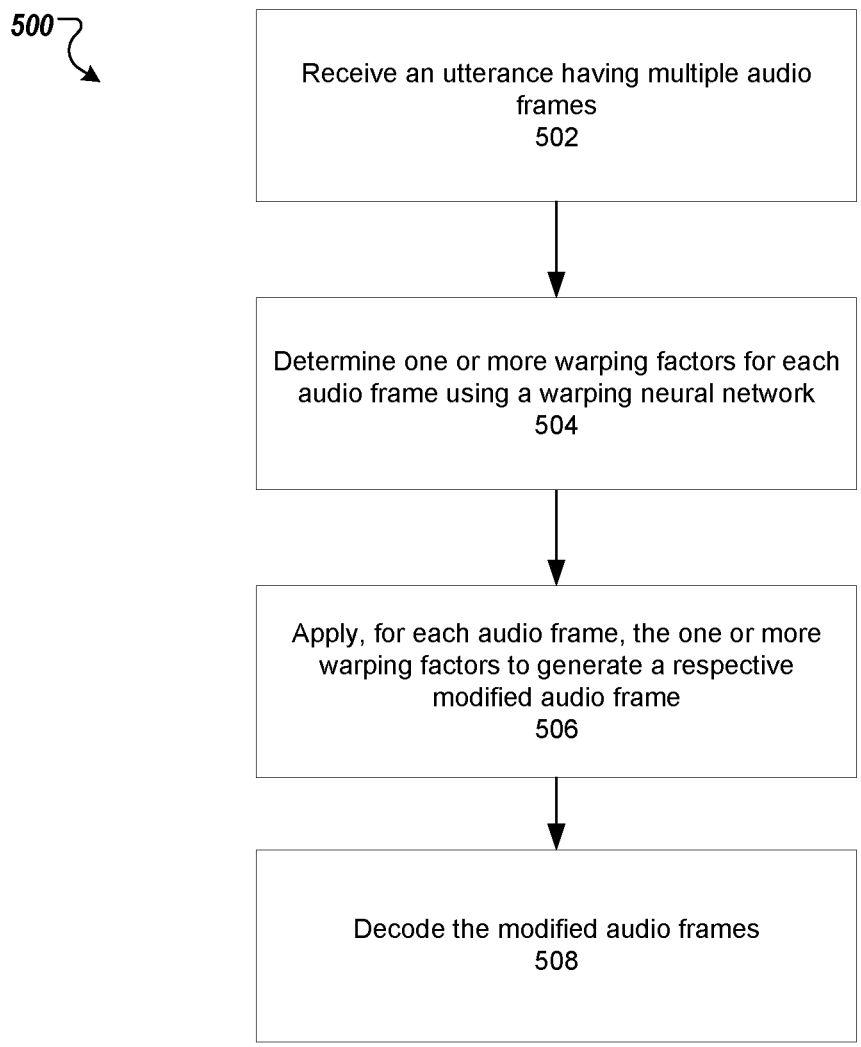
FIG. 5 is a flow diagram of another example method for frequency warping in a speech recognition system.

FIG. 5 is a flow diagram of another example method 500 for frequency warping in a speech recognition system. For convenience, the method 500 will be described with respect to a system, e.g., the system 212 of FIG. 2, having one or more computing devices that execute software to implement the method 500.

The system receives a data sequence representing an utterance (step 502). The sequence can include multiple audio frames as described above in reference to FIG. 2.

The system determines one or more warping factors for each audio frame in the sequence using a warping neural network (step 504). The system determines the warping factors by processing each audio frame using a warping neural network that is separate from a decoding neural network. The warping neural network can be trained on user submitted associations of audio frames and optimal warp factors, on generated training data from a decoding neural network with a warping layer, or both and can output one or more optimal warping factors in response to an audio frame.

The decoding neural network with the warping layer can generate the training data during training by the speech recognition system. That is, the decoding neural network with the warping layer is trained on data that associates sequences of audio frames with transcriptions of the sequences. For each input audio frame to the decoding neural network with the warping layer, the speech recognition system generates a decoding error that is backpropagated to adjust warping factors at the warping layer for the audio frame. The decoding neural network with the warping layer then generates the training data by associating adjusted warping factors in the warping layer for a particular audio frame with the particular audio frame. This is described above with reference to FIG. 2.

The system applies, for each audio frame, the one or more warping factors for the audio frame to the audio frame to generate a respective modified audio frame (step 506). As described above in reference to FIG. 2, the system uses at least one of the warping factors from the warping neural network to scale a frequency of the audio frame to a new respective frequency in the respective modified audio frame.

The system decodes the modified audio frames using a decoding neural network (step 508) as described above with reference to FIG. 2. The decoding neural network is configured to output a word sequence that is a transcription of the utterance.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving a sequence representing an utterance, the sequence comprising a plurality of audio frames;
    processing each audio frame in the sequence using a warping neural network, wherein the warping neural network is configured to process each of the audio frames to generate one or more warping factors for each audio frame in the sequence in accordance with trained values of a set of parameters of the warping neural network, and wherein the warping neural network has been trained on training data that associates each of a plurality of training audio frames with one or more corresponding warping factors;
    applying, for each audio frame, the one or more warping factors generated by the warping neural network for the audio frame to the audio frame to generate a respective modified audio frame, wherein the applying comprises using at least one of the warping factors to scale a respective frequency of the audio frame to a new respective frequency in the respective modified audio frame; and
    decoding the modified audio frames using a decoding neural network, wherein the decoding neural network is configured to output a word sequence that is a transcription of the utterance.

2. The method of claim 1, wherein the training data is generated by another decoding neural network, the other neural network comprising:
    a warping neural network layer configured to apply one or more warping factors for each input training audio frame in an input sequence to the input training audio frame to generate a respective warped input training audio frame from the input training audio frame, and wherein the one or more warping factors are parameters of the warping neural network layer, and
    one or more decoding neural network layers configured to collectively process the warped input training audio frames to generate an output word sequence that is a transcription of an utterance represented by the input audio sequence;

and wherein generating the training data further comprises:

training the other decoding neural network to determine initial trained values of the one or more warping factors, wherein the training comprises, for each training audio frame, backpropagating decoding errors for the training audio frame through the decoding neural network layers to the warping layer to adjust current values of the one or more warping factors; and using, for each training audio frame, the adjusted current values and the training audio frame as the training data to train the warping neural network.

3. The method of claim 1, wherein the applying comprises:

using a first warping factor in the one or more warping factors to scale frequency within a first frequency range of the audio frame; and using a second respective warping factor in the one or more warping factors to scale frequency within a second frequency range of the audio frame to generate the respective modified audio frame.

4. A system comprising:

one or more computers; and computer-readable medium coupled to the one or more computers and having instructions stored thereon, which, when executed by the one or more computers, cause the one or more computers to perform operations comprising:

receiving a sequence representing an utterance, the sequence comprising a plurality of audio frames;

processing each audio frame in the sequence using a warping neural network, wherein the warping neural network is configured to process each of the audio frames to generate one or more warping factors for each audio frame in the sequence in accordance with trained values of a set of parameters of the warping neural network, and wherein the warping neural network has been trained on training data that associates each of a plurality of training audio frames with one or more corresponding warping factors;

applying, for each audio frame, the one or more warping factors generated by the warping neural network for the audio frame to the audio frame to generate a respective modified audio frame, wherein the applying comprises using at least one of the warping factors to scale a respective frequency of the audio frame to a new respective frequency in the respective modified audio frame; and decoding the modified audio frames using a decoding neural network, wherein the decoding neural network is configured to output a word sequence that is a transcription of the utterance.

5. The system of claim 4, wherein the training data is generated by another decoding neural network, the other neural network comprising:

a warping neural network layer configured to apply one or more warping factors for each input training audio frame in an input sequence to the input training audio frame to generate a respective warped input training audio frame from the input training audio frame, and wherein the one or more warping factors are parameters of the warping neural network layer, and one or more decoding neural network layers configured to collectively process the warped input training audio frames to generate an output word sequence that is a transcription of an utterance represented by the input audio sequence;

and wherein generating the training data further comprises:

training the other decoding neural network to determine initial trained values of the one or more warping factors, wherein the training comprises, for each training audio frame, backpropagating decoding errors for the training audio frame through the decoding neural network layers to the warping layer to adjust current values of the one or more warping factors; and using, for each training audio frame, the adjusted current values and the training audio frame as the training data to train the warping neural network.

6. The system of claim 4, wherein the applying comprises:

using a first warping factor in the one or more warping factors to scale frequency within a first frequency range of the audio frame; and using a second respective warping factor in the one or more warping factors to scale frequency within a second frequency range of the audio frame to generate the respective modified audio frame.

7. A computer-readable medium having instructions stored thereon, which, when executed by one or more computers, cause the one or more computers to perform operations comprising:

receiving a sequence representing an utterance, the sequence comprising a plurality of audio frames;

processing each audio frame in the sequence using a warping neural network, wherein the warping neural network is configured to process each of the audio frames to generate one or more warping factors for each audio frame in the sequence in accordance with trained values of a set of parameters of the warping neural network, and wherein the warping neural network has been trained on training data that associates each of a plurality of training audio frames with one or more corresponding warping factors;

applying, for each audio frame, the one or more warping factors generated by the warping neural network for the audio frame to the audio frame to generate a respective modified audio frame, wherein the applying comprises using at least one of the warping factors to scale a respective frequency of the audio frame to a new respective frequency in the respective modified audio frame; and decoding the modified audio frames using a decoding neural network, wherein the decoding neural network is configured to output a word sequence that is a transcription of the utterance.

8. The computer-readable medium of claim 7, wherein the training data is generated by another decoding neural network, the other neural network comprising:

a warping neural network layer configured to apply one or more warping factors for each input training audio frame in an input sequence to the input training audio frame to generate a respective warped input training audio frame from the input training audio frame, and wherein the one or more warping factors are parameters of the warping neural network layer, and one or more decoding neural network layers configured to collectively process the warped input training audio frames to generate an output word sequence that is a transcription of an utterance represented by the input audio sequence;

and wherein generating the training data further comprises:

training the other decoding neural network to determine initial trained values of the one or more warping factors, wherein the training comprises, for each training audio frame, backpropagating decoding errors for the training audio frame through the decoding neural network layers to the warping layer to adjust current values of the one or more warping factors; and using, for each training audio frame, the adjusted current values and the training audio frame as the training data to train the warping neural network.

9. The computer-readable medium of claim 7, wherein the applying comprises:

using a first warping factor in the one or more warping factors to scale frequency within a first frequency range of the audio frame; and using a second respective warping factor in the one or more warping factors to scale frequency within a second frequency range of the audio frame to generate the respective modified audio frame.

* * * * *